United States Patent [19]

Inoue et al.

[11] Patent Number: 5,033,810
[45] Date of Patent: Jul. 23, 1991

[54] OPTICAL DEVICE

[75] Inventors: Hiroaki Inoue, Saitama; Kensuke Ogawa, Hachioji; Koji Ishida, Musashino, all of Japan

[73] Assignee: Hitachi, Ltd., Tokyo, Japan

[21] Appl. No.: 368,030

[22] Filed: Jun. 19, 1989

[30] Foreign Application Priority Data

Jun. 21, 1988 [JP] Japan .................................. 63-151097

[51] Int. Cl.$^5$ ........................... G02B 6/10; H03F 7/00
[52] U.S. Cl. .................................. 350/96.12; 307/425
[58] Field of Search ........................ 350/96.12, 96.13; 307/425, 427

[56] References Cited

U.S. PATENT DOCUMENTS 4,763,019  8/1988  Duguay et al. .................. 350/96.12

OTHER PUBLICATIONS

IEEE "Journal of Quantum Electronics", vol. QE-7, No. 11, Nov. 1971, pp. 523-529.
"Soviet Physics JETP", vol. 2, No. 3, 1956, pp. 466-475.

Primary Examiner—Akm Ullah
Attorney, Agent, or Firm—Kenyon & Kenyon

[57] ABSTRACT

An optical device has multilayer films formed by periodically laminating a number of layers each comprising at least two kinds of optical crystal thin films ($f_n$, $g_n$) having different refractive indices onto a substrate. The multilayer films include a semiconductor material having a large non-linear optical coefficient as a composing material and have artificial optical anisotropy. Since the multilayer films of the optical device have a large non-linear coefficient and optical anisotropy, a non-linear phenomenon such as second-harmonic generation or the like can be efficiently caused.

18 Claims, 3 Drawing Sheets

OPTICAL DEVICE

BACKGROUND OF THE INVENTION

The present invention relates to a novel optical device to which a non-linear phenomenon is applied and, more particularly, to a novel functional optical device using multilayer media having different refractive indices in accordance with the polarizing direction of the light wave.

Many various devices have been proposed as optical devices using the non-linear phenomenon. As a typical device, for instance, a device for causing second-harmonic generation (SHG) has been known. The SHG relates to a method whereby a laser beam having an angular frequency $\omega$, is irradiated to a non-linear optical crystal and a light wave having the angular frequency $2\omega$ is obtained. To efficiently perform the conversion into the second harmonics, it is necessary to select a material having a large non-linear coefficient and to execute the phase matching for making the phase velocity of the fundamental wave coincide with that of the harmonics.

At present, a laser in a visible light range is not put into wide practical use yet because of limitations on material technique. However, a laser in the visible light range can be realized by generating the second harmonics from a laser beam in the infrared range or near the infrared range. This has at present been put into practical use by means of a non-linear material. The high storing density of a optical disk can be realized by using a laser beam in the visible light range with wavelengths shorter than the wavelength of the conventional laser beam in the infrared range.

Hitherto, an optical crystal such as a $KH_2PO_4$ (KDP) crystal or the like has been used to generate the second harmonics. On the other hand, a technique to generate the second harmonics by using a semiconductor is desirable from the viewpoint of providing integration with a semiconductor laser and with the manufacturing technique. However, although a compound semiconductor such as GaAs, Inp, or the like has a large non-linear coefficient, there is no means for giving anisotropy to a medium which is optically isotropic. Thus the second harmonics cannot be efficiently generated. It is a technical subject to solve such problem.

An optical device using the non-linear optical effect of a semiconductor material has been described in IEEE, "Journal of Quantum Electronics", Vol. QE-7, No. 11, pages 523 to 529, 1971 (hereinafter, referred to as paper 1). On the other hand, in "Soviet Physics JETP", Vol. 2, No. 3, pages 466 to 475, 1956 (hereinafter, referred to as paper 2), there has been disclosed a fact that a multilayer film obtained by laminating two kinds of materials which are optically isotropic at a period which is sufficiently-shorter than the wavelength of the light wave exhibits optical characteristics which are equivalent to those of a negative uniaxial optical material.

In paper 1, nothing is considered with respect to having means for providing anisotropy to the media having optically isotropy such as compound semiconductors of the III-V group such as GaAs, Inp, and the like. There is a problem in that although such materials have large non-linear optical constants, the non-linear optical effect, such as the second-harmonic generation or the like, cannot be used. On the other hand, in paper 2, a theoretical examination has been made with respect to the case where two kinds of optically isotropic thin films were periodically laminated, so that there has been obtained the fact that such a laminated multilayer exhibits the optical characteristics which are equivalent to those of a negative uniaxial optical material; however, there is nothing in this paper with regard to the development to a new optical device.

As mentioned above, a practical optical device using the non-linear phenomenon of the semiconductor material has not yet been realized.

The present inventors et al. have executed various experiments and examinations in order to artificially give optical anisotropy to a semiconductor material having a large non-linear optical constant, so that they obtained the result that it is possible to realize optical devices having new functions which cannot be obtained with an individual sole thin films under a special condition.

The present invention is made on the basis of the above result and it is an object of the invention to solve the above new subject and to provide an optical device having the novel function.

SUMMARY OF THE INVENTION

The present invention realize an optical device using a semiconductor material which efficiently causes a non-linear phenomenon.

Although various kinds of non-linear optical phenomena, such as second-harmonic oscillation, parametric oscillation, and the like are considered, the second-harmonic oscillation will now be described as an example.

To realize a semiconductor optical device for efficiently causing the second-harmonic oscillation, it is necessary that a semiconductor material having a large non-linear optical constant is used, that optical anisotropy is given to the optical device, and that phase matching between the fundamental wave and the harmonics is obtained.

As already described above, it is known that many semiconductor materials such as GaAs, Inp, and the like have large non-linear optical constants. Therefore, to efficiently cause the non-linear optical phenomenon, it is important how the optical anisotropy is given to the optical device and how the phase matching is obtained.

An optical device of the present invention is formed by periodically laminating at least two kinds of optical crystal thin films having different refractive indices as a multilayer film onto a substrate. According to the optical device of the present invention, a light wave is input from one edge surface of the multilayer film and the light wave is modulated (wavelength converted) by the optical anisotropy induced in the media of the multilayer film and the resultant modulated light wave is an output. For instance, in the case of producing the second harmonics as an output wave, the optical anisotropy is induced by the multilayer film media and the phase matching is obtained between the ordinary ray and the extraordinary ray with respect to the fundamental wave and the second harmonics, so that the efficient second-harmonic oscillation is realized. It is desirable to form both the substrate and the optical crystal thin films from a semiconductor material.

Assuming that a unit film thickness in the case where at least two kinds of optical crystal thin films mentioned above are laminated one layer by one layer is set to t, a repetitive period of the laminated film is set to N, and a wavelength of light wave is set to λ, the above optical device is constructed so as to satisfy the conditions such that the unit film thickness t is sufficiently smaller than the wavelength λ and that $\lambda \leq t \times N < 10\lambda$.

The media made of the laminated films in which at least the above two kinds of optical crystal thin films are periodically repeated are formed by a super lattice structure. On the other hand, in a preferred case, a single crystalline plate is generally used as the substrate. However, the substrate is not necessarily made of a single crystal.

Although the thin films which are periodically laminated in the invention are ordinarily made of a semiconductor material, all of the films are not necessarily made of a semiconductor material. For instance, it is also possible to construct the present invention in such a manner that one of the semiconductor thin films is replaced by a thin film of an optical material other than a semiconductor. A periodic laminate structure comprising the semiconductor thin films and the other thin films can be also constructed. Various kinds of materials such as magneto-optical thin film, dielectric material, and the like can be used as the optical material.

On the other hand, it is desirable that at least one kind of the optical crystal thin films optically has a uniaxial property.

Further, it is also possible to use a combination of thin films each being optically isotropic, a combination of the thin films respectively having isotropy and anisotropy, or a combination of the thin films each having the anisotropy. In the case of the thin films each having the isotropy, the optical characteristics of the resultant media are uniaxial. However, if a thin film having at least the uniaxial anisotropy exists, the optical characteristics are biaxial. Consequently, although uniaxial thin films are used, biaxial optical device can be realized.

On the other hand, in media comprising the periodic laminate films according to the present invention, each layer has a super lattice structure. However, the thickness of the media is considerably thicker than that of the well-known super lattice device. In other words, the thickness of the ordinary super lattice device layer is extremely shorter and thinner than the wavelength λ of the light wave. On the other hand, in the case of the present invention, there is the relation of $\lambda \leq t \times N < 10\lambda$ as mentioned above and the thickness (t×N) of the media is equal to or is generally larger and thicker than the wavelength λ of the light wave which is used. However, if the media are too thick, the performance as the functional device cannot be sufficiently effected. It is desirable to set the thickness such that $\lambda \leq t \times N < 5\lambda$.

Various kinds of applications of the optical device of the present invention are expected. For instance, a second-harmonic generator can be realized. It is also possible to realize a polarization converter which is constructed in a manner such that electrodes are formed in both end portions of the media and a voltage is arbitrarily controlled by providing voltage applying means, thereby enabling an arbitrary polarization to be given to the light passing through the inside of the media. Further, various types of light modulators can also be constructed by changing physical amounts of the incident light.

The media comprising two or more kinds of periodic multilayer films can be easily formed on a predetermined optical substrate by the thin film forming technique to realize a super lattice by the well-known MBE (Molecular Beam Epitaxy), MOCVD (Metal Organic Chemical Vapor Deposition), or plasma CVD.

In the present invention, in the case where the media comprising the laminate films which are periodically repeated are constructed by a laminate structure of two kinds of first and second optical crystal thin films, when it is assumed that a refractive index in the in-plane direction of the first optical crystal thin film is set to $n_{ap}$, a refractive index in the direction perpendicular to the plane of the first film is set to $n_{as}$, and its film thickness is set to a, and those of the second optical crystal thin film are set to $n_{bp}$, $n_{bs}$, and b, the effect of the light modulation of the invention can be maximally effected by forming such a laminate structure so as to satisfy the following general equations (1) and (2) among those coefficients.

$$\frac{1}{6} F \leq \frac{b}{a} \leq 6F \tag{1}$$

$$F = \frac{n_{bs}\left[n_{as}\sqrt{|n_{as}^2 - n_{bs}^2|} - n_{bs}\sqrt{|n_{ap}^2 - n_{bp}^2|}\right]}{n_{as}\left[n_{as}\sqrt{|n_{ap}^2 - n_{bp}^2|} - n_{bs}\sqrt{|n_{as}^2 - n_{bs}^2|}\right]} \tag{2}$$

In the present invention, the media comprising the laminate films which are periodically repeated modulate the incident light. That is, even if each thin film of the media is optically isotropic in the case of the multilayer media, the property optically having the uniaxial anisotropy is caused and the incident light is modulated by such a property. On the other hand, when the thin films of the media are individually anisotropic a new anisotropy, different from the anisotropy which is peculiar to the individual thin films is induced, or even if the anisotropic property does not change, a large difference of such an extent is induced and a new function is effected on the basis of such new anisotropies induced.

To simplify the description, the example of the media constructed by periodically laminating two kinds of super lattice thin films will now be practically explained.

Assuming that the refractive index in the plane of the first thin film is set to $n_{ap}$, the refractive index in the direction perpendicular to the plane thereof is set to $n_{as}$, its film thickness is set to a, and those of the second thin film are respectively set to $n_{bp}$, $n_{bs}$, and b, a refractive index $n_p$ of the multilayer films for the polarization in the in-plane direction and a refractive index $n_s$ for the polarization in the direction perpendicular to the plane are respectively obtained as follows.

$$n_p^2 = \frac{a n_{ap}^2 + b n_{bp}^2}{a + b} \tag{3}$$

$$n_s^2 = \frac{n_{as}^2 + b_{bs}^2 (a + b)}{a n_{bs}^2 + b n_{as}^2} \tag{4}$$

By arbitrarily adjusting the film thicknesses a and b, the extent of anisotropy can be arbitrarily adjusted. The extent $(n_p^2 - n_s^2)$ of the anisotropy which is calculated by the equations (3) and (4) becomes maximum when $$\frac{b}{a} = F$$

-continued $$F = \frac{n_{bs}\left[n_{as}\sqrt{|n_{as}^2 - n_{bs}^2|} - n_{bs}\sqrt{|n_{ap}^2 - n_{bp}^2|}\right]}{n_{as}\left[n_{as}\sqrt{|n_{ap}^2 - n_{bp}^2|} - n_{bs}\sqrt{|n_{as}^2 - n_{bs}^2|}\right]}$$

It has been confirmed that the effect of the present invention is typical when those coefficients satisfy the following relation.

$$\frac{1}{6}F \leq \frac{b}{a} \leq 6F$$

As mentioned above, according to the present invention, the optical device using a semiconductor material which efficiently causes the non-linear optical phenomenon is realized.

DETAILED DESCRIPTION

An embodiment of the present invention will be described hereinbelow.

EMBODIMENT 1

Figure 1:
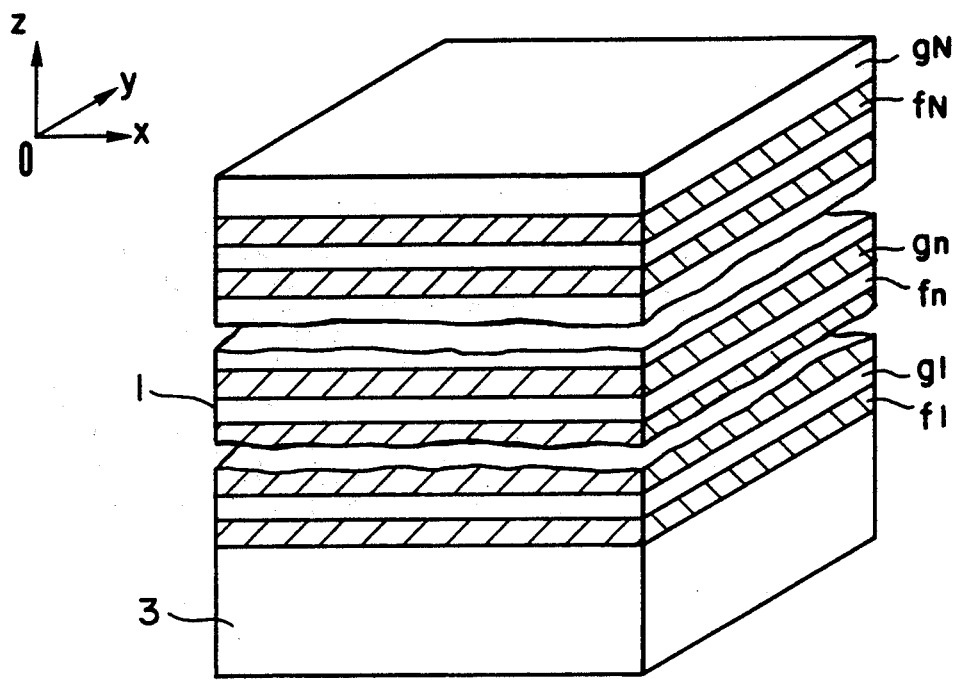
FIG. 1 is a diagram for explaining an optical device according to an embodiment of the present invention.
Figures 2, 3:
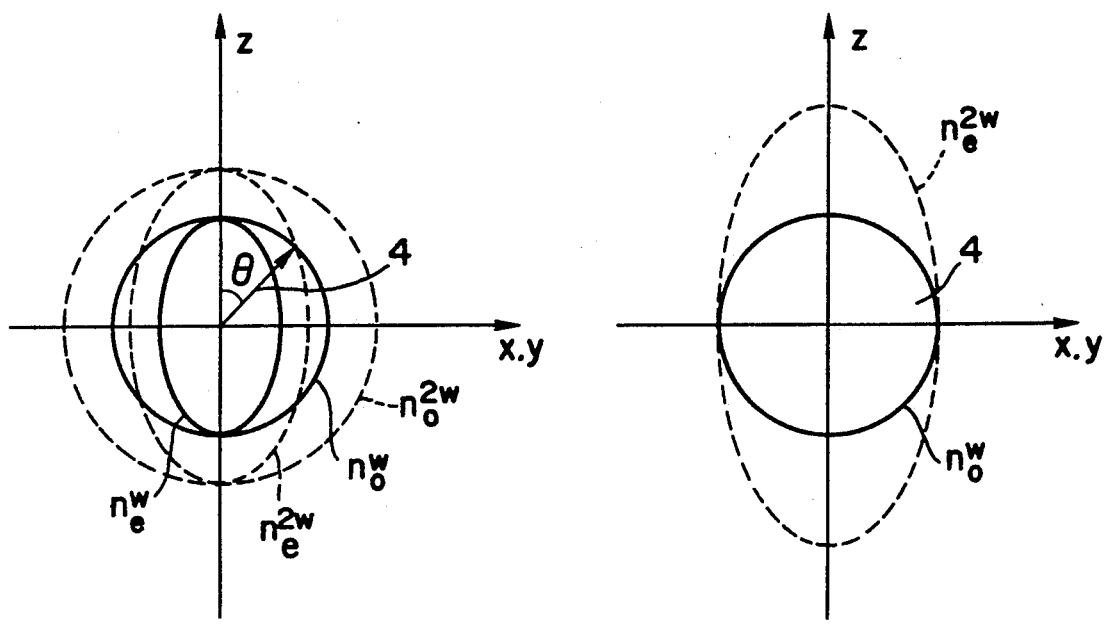
FIG. 2 is a diagram showing three-dimensional coordinates of a refractive index distribution in media for explaining the operation of the optical device of the present invention.
FIG. 3 is a diagram showing three-dimensional coordinates of a refractive index distribution in media for explaining the operation of the optical device of the present invention.

A construction and the operation of an embodiment of the present invention will be described with reference to FIGS. 1 to 3. The embodiment relates to the case where the principle of the prevent invention is applied to a secondharmonic generator. FIG. 1 is a diagram showing a structure in which two kinds of semiconductor thin films $f_n$ and $g_n$ ($n=1, \ldots, N$) are laminated on a semiconductor substrate 3. The case where GaAs and AlGaAs are used as the semiconductor thin films $f_n$ and $g_n$ and semiinsulative GaAs is used as the substrate 3 will now be described as an example. Each of the thin films optically has a peculiar isotropy. A multilayer structure is constructed by periodically laminating two hundreds of layers comprising the GaAs layers which each have a thickness of 110 Å and the $Al_{0.3}Ga_{0.7}As$ layers each have a thickness of 100 Å. Thus, the whole thickness of the laminated films is set to 4.2 μm. The total thickness of the GaAs layers is set to 2.2 μm and that of the $Al_{0.3}Ga_{0.7}As$ is set to 2 μm. Therefore, the optical device exhibits the optical characteristics of a negative uniaxial crystal and the main cross section of a refractive index ellipsoid is as shown in FIG. 2. That is, since the device is negative uniaxial, the elliptic refractive index distribution of the extraordinary light is located on the inside of a circular refractive index distribution of the ordinary light. Refractive indices of the ordinary light (circle) and extraordinary light (ellipse) for the wavelength $\lambda = 3.39$ μm of the light wave entering the media in FIG. 1 are shown by solid lines and are represented by $n_0^\omega$ and $n_e^\omega$. Refractive indices of the ordinary light and extraordinary light for the second harmonics are shown by broken lines and are indicated by $n_0^{2\omega}$ and $n_2^{2\omega}$. From the diagram, the cross point of $n_0^\omega$ and $n_e^\omega$ represents the phase matching condition. By setting an incident angle into the direction which is inclined by an angle $\theta$ for a Z axis and is shown by an arrow 4, the second harmonics having a wavelength of 1.695 μm corresponding to ½ λ of the incident light could be obtained. The angle $\theta$ is determined by the values of $n_0^{2\omega}$ and $n_2^{2\omega}$. The extent of the anisotropy was then adjusted by adjusting the refractive indices and the film thicknesses of semiconductor thin films 1 and 2 by changing the mixing ratio of Al and Ga of the semiconductor thin film (AlGaAs layer). Thus, as shown in FIG. 3, the values of $n_0^\omega$ and $n_e^{2\omega}$ can be made coincident on the x and y axes. That is, the direction of the incident light can be set to be vertical to the Z axis. The mutual operation lengths become long. The incident direction of the incident light and the outgoing direction of the second harmonics are equal. The second harmonics could be efficiently extracted.

It is preferable that the incident direction (angle $\theta_0$) of the incident light lies within an angle range which is given by the following equation from the coincident direction (angle $\theta$).

$$\theta - \Delta\theta < \theta_0 < \theta + \Delta\theta$$

$$\Delta\theta = \frac{4}{n} \frac{\lambda}{l}$$

where, λ is the wavelength of the incident light wave, n is an average refractive index of the media into which the light enters, and l is a distance at which the incident light wave propagates in the media.

In the of the present invention, a similar effect was obtained even when the semiconductor material was replaced by other III-V group compound semiconductor such as Inp, InGaAs, InAlAs, InGaAsp, etc. or II-VI group compound semiconductor such as ZnSe, ZnS, CdS, CdTe, etc. The ZnSe system super lattice is suitable for generation of the second harmonics in the blue range since the attenuation in the short wavelength range is small.

EMBODIMENT 2

A second embodiment has the same construction as that of the first embodiment shown in FIG. 1. The light wave having a wavelength $\lambda = 1.06$ μm was input in the direction of the y axis as a linear polarized beam which is inclined by an angle of 45° in the x-z plane. The phase difference of the components in the directions of the x and z axes of the outgoing light which had propagated by only the length l was measured Thus, the phase difference of $$\frac{2\pi}{\lambda}(n_0 - n_e)l$$

could be obtained in correspondence to a refractive index $n_0$ of the x-axis polarized light (ordinary light) and a refractive index $n_e$ of the z-axis polarized light (extraordinary light). Consequently, it could be confirmed that the device functions as a polarization converter and a modulator.

EMBODIMENT 3

Figure 4A:
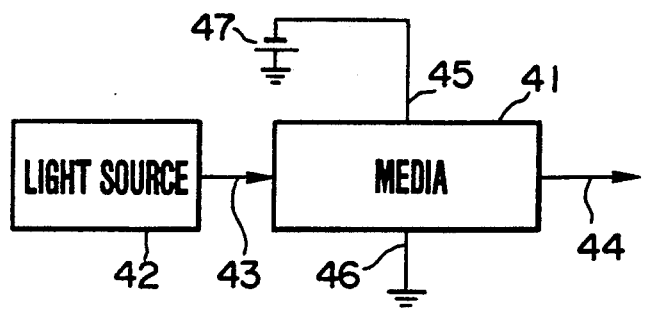
FIG. 4A is a diagram for schematically explaining a light modulator using an embodiment of the present invention.

A third embodiment relates to an embodiment of a light modulator and its schematic diagram is diagrammatically shown in FIG. 4A. In the diagram, reference numeral 41 denotes a light modulator main section comprising media which are constructed by periodically laminating the thin films of GaAs and AlGaAs in a manner similar to FIG. 1; 42 indicates a light source; 43 an incident light; 44 an outgoing light modulated in the media 41; 45 and 46 electrodes to apply a voltage to the media 41; and 47 a power source. As will be obvious from the diagram, when the incident light 43 enters the media 41, the incident light is polarized in accordance with the applied voltage from the power source 47, so that the polarized light modulated by the applied voltage is derived as the outgoing light 44.

Figure 4B:
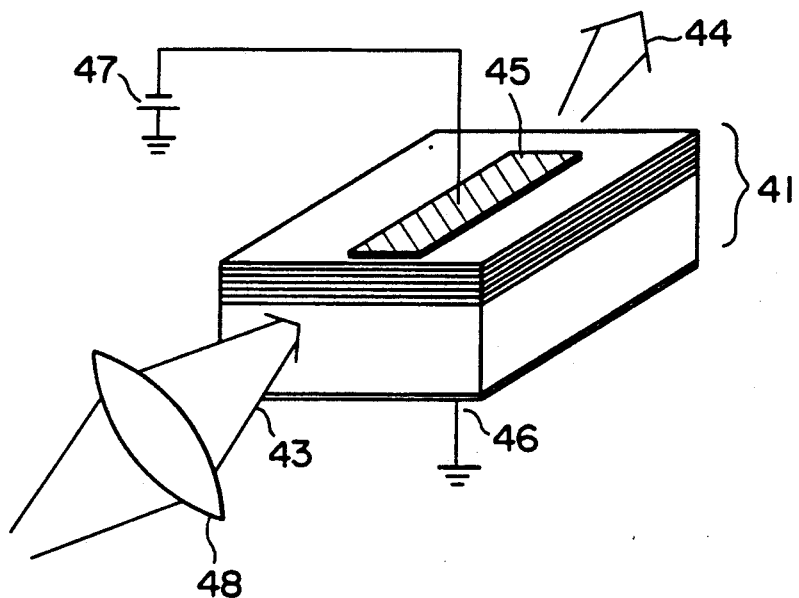
FIG. 4B is a diagram for explaining the operation using an light modulator of the embodiment of the present invention.

FIG. 4B shows the main section in a practical example of the light modulator. A semiconductor laser is used as the light source 42. The light wave having wavelength $\lambda=1.30$ μm is focused by the lens 48 and is input into the media 41 and the DC voltage of 15 V is applied across the electrodes 45 and 46. Thus, the modulated light 44 whose phase had been changed by only $\pi$ was obtained.

EMBODIMENT 4

Figure 5:
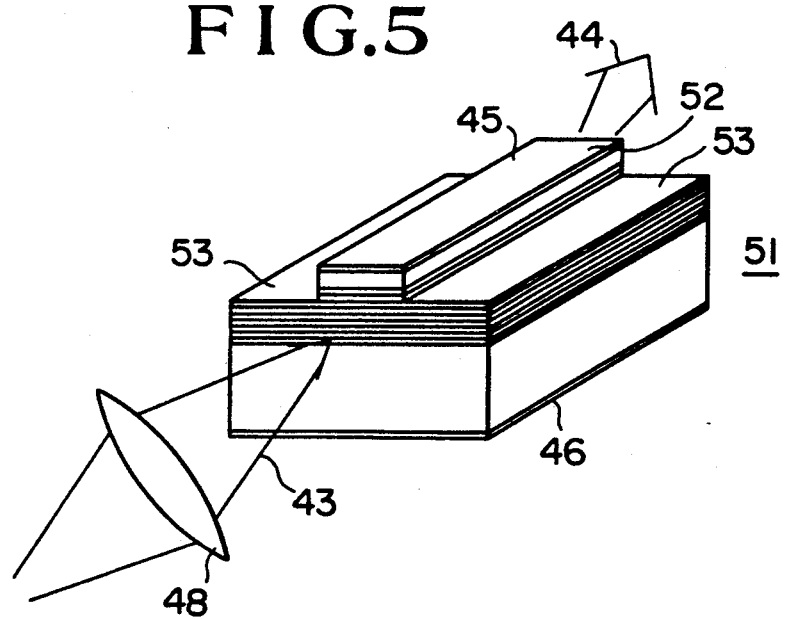
FIG. 5 is a diagram for explaining another embodiment of a light modulator of the present invention.

FIG. 5 shows a cross sectional structure of the main section of a light modulator having a structure such that a part of the upper surface of a laminated media 51 is left like a stripe 52 in accordance with the propagating path of the light and both sides 53 of the media 51 are etched like a mesa. By providing the stripe structure, the light wave passing in the media is kept in the stripe structure and the modulated light can be efficiently emitted by using the stripe structure as a waveguide.

In any of the above embodiments, the media have been constructed by the periodic laminate films comprising only the semiconductor thin films. However, as mentioned above, one kind of the semiconductor thin film can be replaced by an optical thin film. For instance, the laminate films may be also combined with thin films having the magneto-optical or electro-optical characteristics such as rare earth magnetic garnet thin films, gallium molybdate, or the like.

The optical device of the present invention is formed by alternately laminating a number of layers comprising at least two kinds of optical crystal thin films having different refractive indices onto the substrate. The optical device has light wave modulating means for modulating the incident light by the optical anisotropy that modulated light emitting and light wave inputting means for inputting the light wave to the light wave modulating means.

Figure 6A:
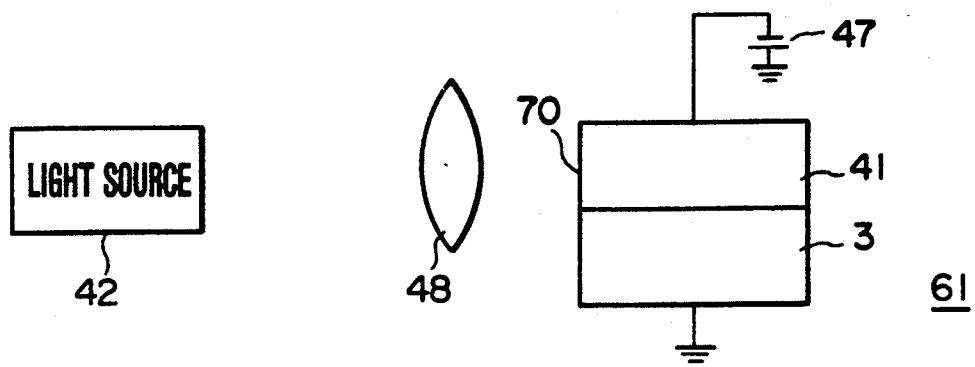
FIG. 6A is a diagram for explaining an embodiment of an optical device using an embodiment of the invention.

In FIG. 6A, a light source 42 such as a semiconductor laser or the like and the lens 48 which are used to input the light wave are arranged separately from an optical device 61. The optical device 61 has the multilayer film media 41 to modulate the light wave. The edge surfaces of the multilayer film media 41 are processed so as to be suitable to input the light wave and are coated to prevent deterioration.

Figure 6B:
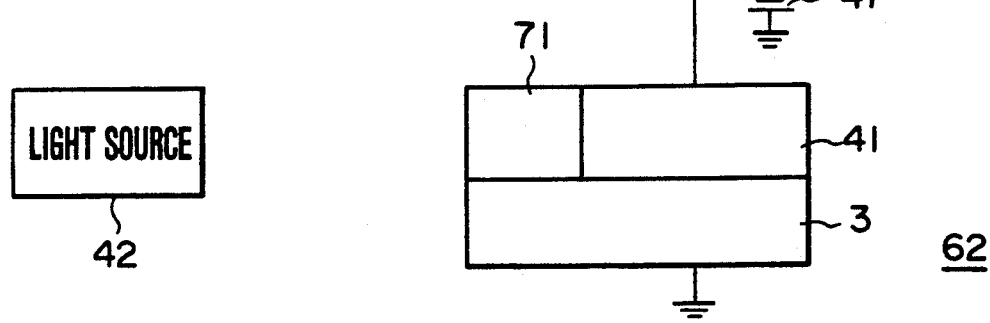
FIG. 6B is a diagram for explaining another embodiment of the optical device using an embodiment of the invention.

In FIG. 6B, the light source 42 such as a semiconductor laser or the like which is used to input the light wave is arranged separately from an optical device 62. The optical device 62 has the multilayer film media 41 to modulate the light wave and an optical waveguide layer 71 to input the light wave to the multilayer film media 41. The optical waveguide layer 71 is arranged so as to input the light wave to the multilayer film media at a predetermined angle as necessary. A means, such as a lens or the like, for converging the light can be also formed together with the optical waveguide layer 71.

Figure 6C:
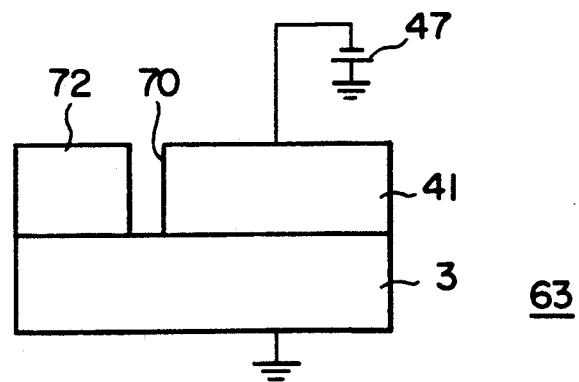
FIG. 6C is a diagram for explaining yet another embodiment of the optical device using an embodiment of the invention.

In an optical device 63 in FIG. 6C, a light wave inputting apparatus 72 comprising a semiconductor laser or the like and the multilayer films 41 which are used to modulate the light wave are integrally formed on the substrate 3. The edge surfaces of the semiconductor laser 72 and multilayer films 41 are coated. As necessary, the optical axis of the light wave inputting apparatus 72 is arranged so that the light wave enters the edge surfaces of the multilayer films 41 at a predetermined angle.

The optical device of the present invention operates in a wide range from 200 nm to 10 μm as the wavelength of the incident light wave. Particularly, the application of the optical device is especially significant with respect to the range from 400 nm to 2 μm as the wavelength of the incident light wave.

According to the present invention, by artificially giving the optical anisotropy to the semiconductor material having a large non-linear optical coefficient, the highly efficient second-harmonic generating device, polarization converter, modulator, and the like can be provided. Therefore, an optical integrated circuit having a high degree of functionally which is necessary for the light information processing and transmitting system can be provided.

What is claimed is:

1. An optical device comprising:
   a substrate; and
   a multilayer structure being formed on said substrate including a first unit layer and a second unit layer having different refractive indices so that the multilayer structure assumes specific optical anisotropy and having a non-linear optical constant originating in the unit layer,
   wherein said multilayer structure provides a modulated light in accordance with the specific optical anisotropy.

2. An optical device according to claim 1, wherein said first unit layer includes at least one layer of an optical crystal thin film which is optically isotropic.

3. An optical device according to claim 1, wherein said first unit layer includes at least one layer of an optical crystal thin film which is optically uniaxial.

4. An optical device according to claim 1, wherein said first unit layer includes at least one layer comprising a III-V group compound semiconductor.

5. An optical device according to claim 1, wherein said first unit layer includes at least one layer comprising a II-VI group compound semiconductor.

6. An optical device according to claim 1, wherein said first unit layer comprises a GaAs super lattice layer and said second unit layer comprises an A GaAs super lattice layer.

7. An optical device according to claim 1, wherein a film thickness of a unit which is constructed by laminating said first unit layer and said second unit layer is set to a value t, the number of laminating times of the unit layers is set to an integral value N, and a wavelength of the incident light wave is set to $\lambda$, said unit film thickness t is sufficiently shorter than said wavelength $\lambda$ and $\lambda \leq t \times N \leq 10$.

8. An optical device according to claim 1, wherein a film thickness of a unit which is constructed by laminating said first unit layer and said second unit layer is set to t, the number of laminating times of the unit layers is set to N, and a wavelength of the incident light wave is set to $\lambda$, said unit film thickness t is sufficiently shorter than said wavelength $\lambda$ and $\lambda \leq t \times N \leq 5$.

9. An optical device according to claim 1, wherein an incident direction (angle $\theta_0$) of a light wave to be modulated is set to a direction (angle $\theta$) such that in a medium of said multilayer structure, a refractive index for second harmonics of the light wave coincides with a refractive index for a fundamental wave.

10. An optical device according to claim 1, wherein an incident direction (angle $\theta_0$) of a light wave to be modulated lies within an angle range which is expressed by the following equations from a direction (angle $\theta$) such that in said medium of said multilayer structure, a refractive index for second harmonics of the light wave coincides with a refractive index for a fundamental wave:

$$\theta - \Delta\theta < \theta_0 < \theta + \Delta Q$$

$$\Delta\theta = \frac{4}{n} \frac{\lambda}{l}$$

where
$\lambda$: a wavelength of the incident light wave,
n: an average refractive index of the medium into which the light wave enters,
l: a distance at which the incident light wave propagates in the medium.

11. An optical device according to claim 1, wherein in said medium of said multilayer structure, a direction (angle $\theta$) at which a refractive index for second harmonics of said light wave coincides with a refractive index for a fundamental wave is a direction of a normal line of edge surfaces of the multilayer structure.

12. An optical device according to claim 1, wherein said multilayer structure includes first and second optical crystal thin film, and a refractive index in an inplane direction of said first optical crystal thin film is set to a first value $n_{ap}$, a refractive index in a laminating direction of said first film is set to a second value $n_{as}$, and its film thickness is set to a third value a, a refractive index in an in-plane direction of said second optical crystal thin film is set to a fourth value $n_{bp}$, a refractive index in a laminating direction of said second film is set to a fifth value $n_{bs}$, and its film thickness is set to a sixth value b, the following relations are satisfied:

$$\frac{1}{6} F \leq \frac{b}{a} \leq 6F$$

$$F = \frac{n_{bs}\left[n_{as}\sqrt{|n_{as}^2 - n_{bs}^2|} - n_{bs}\sqrt{|n_{ap}^2 - n_{bp}^2|}\right]}{n_{as}\left[n_{as}\sqrt{|n_{ap}^2 - n_{bp}^2|} - n_{bs}\sqrt{|n_{as}^2 - n_{bs}^2|}\right]}$$

13. An optical device according to claim 1, wherein said multilayer structure is formed like a stripe structure, said light wave passing in the multilayer structure is kept in said stripe structure, thereby improving a modulating efficiency.

14. An optical device according to claim 1, wherein a wavelength of a incident light wave of said optical device lies within a range of from 200 nm to 10 $\mu$m.

15. An optical device according to claim 1, wherein a wavelength of an incident light wave of said optical device lies within a range of from 400 nm to 2 $\mu$m.

16. An optical device comprising:
a substrate; and
a multilayer structure being formed on said substrate, including a first and a second unit layers having different refractive indices on said substrate so that the multilayer structure assumes specific optical anisotropy, and having a non-linear optical constant originating in the unit layers,
wherein a fundamental wave of a received light wave is converted into second harmonics by phase matching the fundamental wave of the light wave and second harmonics in the structure, said second harmonics being emitted by said structure.

17. An optical device comprising:
means for modulating incident light; and
means for inputting a light wave to said means for modulating; and
wherein said wave modulating means comprises a multilayer structure including first and second unit layers having different refractive indices on a substrate so that the multilayer structure assumes specific optical anisotropy, and having a non-linear optical constant originating in the unit layers,
and wherein said means for modulating further emits the modulated light.

18. An optical device according to claim 17, wherein said means for inputting is arranged so as to input the light wave in a direction such that in the multilayer structure said means for modulating, a refractive index for second harmonics substantially coincides with a refractive index for a fundamental wave.

* * * * *